ved June 14, 1960

2,940,889
VINYL-COATED FABRICS

John L. Justice, Wallingford, Pa., assignor to American Viscose Corporation, Philadelphia, Pa., a corporation of Delaware No Drawing. Filed June 29, 1955, Ser. No. 518,946

18 Claims. (Cl. 154—136)

This invention relates to products which are known as coated fabrics or fabric-reinforced plastic sheetings, and particularly to a fabric-film laminate which is stretchable in any direction with respect to the general direction of the yarns comprising the fabric. Moreover, this invention concerns fabric-film laminates of which the fabric comprises continuous filament yarns.

In the manufacturing of thin flexible fabric-resin laminates, cotton fabric has been the preferred material because of cost and the facility with which most resins used in such laminates may be adhered to the fabric. However, the use of rayon fabric as a reinforcing medium for resin has advantages over cotton fabrics such as a more stable price which allows the manufacturers to contract over longer periods with industrial users and purchasers for the retail market. Furthermore, on account of the relative bulk of cotton fabric, reinforced plastic sheeting may be provided when made with rayon fabric in the same strength but with thinner overall thickness of the sheeting, thus making the sheeting more desirable for certain end uses. Moreover, there is a growing demand for stretchable reinforced plastic sheetings which may be fitted more neatly as the upholstery covering members for furniture and automobile seats. To meet this requirement it is necessary to use low cost stretchable fabrics, e.g., knitted goods. At present, tricot type fabrics which are low in cost are limited to the use of artificial continuous filament. Cost-wise, rayon fiber, and particularly continuous filament rayon, is immediately suggested as the desirable textile for making reinforcing fabrics, but in the past it has not been favored because of the difficulty of making it adhere firmly to resins such as polyvinyl chloride. As a further consideration, cotton fabric normally has variations in thickness and bulk which are reflected in the quality of the finished reinforced laminate. Such variations may be overcome by the use of continuous filament which is normally manufactured to comparatively high standards of uniformity provided that sufficient adhesion may be obtained. For convenience, the term "fibers" as used herein includes staple fibers as well as continuous filaments.

A primary object of the present invention is to improve the adhesion of regenerated cellulose fiber with resins used in the manufacturing of coated fabrics, or reinforced plastic sheets to the extent that rayon fabrics may be readily substituted for reinforcing fabrics of other types of fibers now prevalently used. Another object is to provide a reinforcing fabric of rayon for use as a component of stretchable reinforced plastic sheeting. It is also an object to provide thinner plastic reinforcing fabrics of comparable strength and more uniform texture than those now in common use whereby correspondingly lighter gauge laminates may be constructed. A further object is to facilitate the use of continuous filament yarns in the construction reinforcing fabrics for plastics whereby flexible fabric-laminates of more uniform thickness and improved appearance may be constructed. Other objects and advantages will become apparent from the following description of the invention.

In brief the invention concerns treating fibers, regenerated cellulose yarns, or other fabric forming strands of rayon with an alkylenimine before or after incorporation into a fabric and uniting the alkylenimine-impregnated fabric with a vinyl resin film to form a coated fabric or fabric-reinforced plastic sheet. In one preferred embodiment, the fabric of the laminate comprises yarns of continuous filaments interwoven by knitting. The alkylenimine may be applied to the fibers while in the gel state as an ingredient of the finishing solution through which freshly spun yarn is normally passed before drying, or it may be applied by soaking the dried yarn or fabric in an aqueous solution of the alkylenimine, or the fabric may be sprayed with an alcoholic solution thereof.

Of the polyalkylenimines, polyethylenimine is presently preferred because of its availability in commercial quantities. However, such polyalkylenimines as polymers of propylenimine, butylenimine, propyl ethylenimine, benzylethylenimine and others comprising the recurring ethylenimine groups of a polymer molecule characterize the effective bonding agents of this invention. It is necessary that these imine polymers have a substantial degree of polymerization. Polymers having a degree of polymerization below about 50 are not fully satisfactory for the purposes of this invention although they function more effectively as adhesion media, as the degree of polymerization is increased. For example, an ethylenimine polymer which has a molecular weight of about 315 (when diluted to a 1 percent aqueous solution has a viscosity of 0.12 at 25° C.) does not have adequate strength for bonding the film and the rayon cloth, whereas an ethylenimine polymer having a viscosity under like conditions of 0.25 has a molecular weight approaching 4500 (calculated) and is such an effective bonding agent that in most cases the cloth or the film, depending on their relative strengths, will tear before the joint separates. Polyethylenimines having a molecular weight below about 2300 (calculated) corresponding to a degree of polymerization of approximately 55 are not satisfactory anchoring agents although they provide some adhesion. Commercially prepared polyethylenimines found satisfactory are Polymin P manufactured by the Badische Aniline and Fabric Corp. (Germany) and polyethylenimine having a degree of polymerization of about 82 and a viscosity (1 percent solution at 25° C.) of 0.23 manufactured by the Monomer Polymer Corp. (U.S.). The molecular weights of polyethylenimines herein indicated as calculated were obtained by the method described in the "Journal of Chemistry," vol. 9, pages 141–146 (1944).

A preferred method of applying a polyalkylenimine to a fabric is to include it as an ingredient of the finish solution for yarn, i.e., the final solution applied just before drying the yarn. The finish solution contains one of the so-called yarn finishes which facilitate the handling of the yarn culminating in the formation of a fabric. In fact, the polyalkylenimine may be added to a finish solution to partially supplant a conventional finish ingredient and, in addition, to function to full extent as a medium for bonding the complete fabric to the vinyl sheeting. Thus, the polyalkylenimine functions in this form of the invention, in a dual capacity as a yarn-finish and as an anchor material for the laminae. Reduction of the amount of conventional finish material used and substitution of the polyalkylenimine for the eliminated portion of the finish material appears to be generally desirable since the use of normal amounts of the finish material reduces the effectiveness of the polyalkylenimine as a bonding medium. When the cost of additional treatment steps is warranted in order that the fabric attached to the vinyl sheeting be entirely free from a yarn or fabric sizing or finish, the fabric may be scoured to remove any such additives, then treated with a polyalkylenimine solution and dried. If the polyalkylenimine is to be applied to the dry fiber or fabric, organic solutions of the imine, such as an alcoholic solution may be used and the solvent recovered.

Although ideal conditions cannot be presently set forth with respect to all aspects of practicing the invention, sufficient data is at hand to indicate satisfactory conditions or ranges thereof in the manufacturing of rayon fabric vinyl plastic laminates of excellent adhesion. The effective concentration range of the solution to be imbibed by the yarn or fabric appears to be between 0.05 and 5 percent or greater by weight. Nearly optimum results may be obtained at about 0.5 percent concentration whereas about 80 percent of optimum adhesion may be obtained with solutions of about 0.06 percent concentration. In processes wherein the fabric or fibers are received for polyalkylenimine treatment in a wet condition, the concentration of the dipping bath is readily adjusted to some level higher than the concentration of the liquid desired in the textile material carried out of the bath to compensate for dilution and the rapidity with which the textile material passes through the bath.

Other factors influencing the strength of adhesion of the fabric to the vinyl film are the temperature of sealing and time period during which the fabric and the film are pressed together at the temperature and pressure selected. For example, adhesion strengths of test pieces comprising rayon fabrics and vinyl sheet joined at 170° C. were nearly twice as strong as similar pieces formed at 150° C. In tests carried out at 160° C., maximum adhesion occurred between the laminae in periods of 15 to 30 seconds of heat and pressure as developed between two electrically heated platens. In commercial operation, equivalent heating may be carried out on the basis of shorter heating periods by using higher temperatures, and using multiple sets of heated nip rolls.

Any type of rayon fabric may be treated with a polyalkylenimine to increase its capacity to bond firmly with a vinyl resin. Typical of the fabrics that may be used is the square-woven type conventionally used as a reinforcing fabric for vinyl sheetings. However, the present invention has especial significance in the construction of reinforced vinyl sheetings which are stretchable in any direction relative to the general direction of the yarns of the fabric because knitted rayon fabrics are especially difficult to adhere to the plastic sheeting. This difficulty is further worsened if the fabric comprises continuous filament yarn as required by the tricot knitting system. Knitted and tricot fabrics are most cheaply produced and are entirely satisfactory as the reinforcing fabric for the resinous sheet when treated with a polyalkylenimine. Apparently, because of the rougher surface provided by the "reverse side" or "wrong side" of the fabric, the vinyl sheeting makes a substantially better bond therewith than with the "face" or "right side" of the fabric. This is a highly satisfactory result since the smoother side of the fabric-reinforced sheet is thus exposed and the overall thickness of the sheet is thinner than if the rougher or reverse side was exposed.

The following examples will illustrate the invention in a number of its aspects.

EXAMPLE 1

This example illustrates the use of polyethylenimine solutions of different concentrations. A large number of samples were prepared by scouring a piece of 28 cut single feed knit fabric made in a 22 inch circular machine comprising 200 denier 40 filament rayon yarn to remove all finish media. The cloth was cut into test strips 2 inches by 8 inches. The pieces were divided into groups of which each group was soaked for 2 minutes in a polyethylenimine (Polymin P) solution of a specific concentration designated in percentage by weight of the solution from the following 0, 0.03, 0.06, 0.12, 0.25, 0.5, 1.0, 2.0, and 4.0. Excess solution was squeezed from the pieces and when weighed immediately thereafter were found to have gained in weight about 165 percent. The pieces were dried at 60–75° C. for approximately 30 minutes. Flat strips of polyvinyl chloride film 2 mils thick were prepared of the same size as the fabric strips; each strip of film was sealed to a strip of fabric at 5 spaced places by placing the film and the fabric between two pieces of uncoated cellophane and heating the assembly between two metal platens ½ inch in diameter and electrically heated to 160° C. The pressure applied by the platen was 5 pounds per square inch. The strength of the seal between the laminae was tested by putting the fabric in one set of jaws of a Suter tester and the film between the other pair of jaws, and pulling the film from the cloth at ¾ inch per second. The maximum tension on one set of jaws was recorded as found in the table below. Test pieces were made with the vinyl sheet attached to the "face" of the cloth and other pieces were prepared under similar conditions with vinyl sheet attached to the "reverse side" of the cloth. Each value given below represents the average for the 5 seals of a single test piece.

*Table I*

| Solution as identified by percentage of imine therein | Strength of seals in grams film attached to— | |
|---|---|---|
| | Face | Reverse Side |
| 0 | 24, 19, 20 | 100, 106, 106 |
| 0.03 | 77, 103, 129 | 478, 570, 478 |
| 0.06 | 216, 234, 152 | 550, 480, 562 |
| 0.12 | 252, 266, 262 | 612, 628, 590 |
| 0.25 | 238, 258, 270 | 528, 612, 596 |
| 0.50 | 272, 222, 322 | 608, 500, 516 |
| 1 | 296, 310, 300 | 612, 506 |
| 2 | 468, 306, 400 | 658, 570, 843 |
| 4 | 356, 366, 368 | 608, 736, 608 |

From the foregoing table it appears that somewhat less than ¼ percent of the polyethylenimine in the impregnating solution is ample for maximum adhesion. It was found that the dry fabric had increased in weight after the soaking and wringing steps about 165 percent i.e., the wet weight was 265 percent greater than the dry weight. Many of the values over 500 grams given in the foregoing table are values at which the film tore and the actual strength of adhesion was therefore not obtained.

EXAMPLE 2

This example illustrates the preparation of fabric-film seals at different sealing temperatures. Test pieces comprising rayon knit fabric adhered to polyvinyl chloride film were made as described in Example 1 with concentration of the polyethylenimine solution used in preparing all samples at ½ percent. The polyethylenimine used was that hereinabove described and manufactured by the Monomer Polymer Corporation. Seal strengths were obtained in accordance with the following table. Each value represents an average strength of 5 seals.

*Table II*

| Temperature (° C.) for making the seal | Strength of seals in grams film attached to— | |
|---|---|---|
| | Face | Reverse Side |
| 150 | 87, 90, 98 | 364, 378, 428 |
| 160 | 272, 222, 322 | 608, 500, 516 |
| 170 | 433, 384, 426 | 638, 762, 708 |

EXAMPLE 3

This example illustrates the effect of length of time during which heat and pressure is applied to make the seal. Samples were made as described in Example 1 with the temperature of the sealing platens maintained at 160° C. and the strength of the solution used to impregnate the knitted rayon fabric of the fabric-film laminate at 2 percent. Each of the values below represent an average strength of 5 seals.

*Table III*

| Time period of sealing in seconds | Strength of seals in grams film attached to— | |
|---|---|---|
| | Face | Reverse Side |
| 30 | 304, 286, 272 | 517, 594, 548 |
| 15 | 270, 256 | 622, 636, 616 |
| 5 | 69, 65 | 283, 280, 251 |

EXAMPLE 4

This example illustrates the treatment of yarn with polyethylenimine rather than fabric as illustrated by the previous examples. It also illustrates the use of an alkylenimine in partial substitution of a conventional finish material needed to facilitate the formation of yarns into fabrics. An aqueous solution of 0.6 percent of finish composition (called hereinafter ingredient A) comprising one part of 2 dendro stearic acid and 2 parts 16 dendro sorbitan tristearate is typical of conventional solutions that may be applied to rayon yarn before drying. It is usually applied by flushing the solution through the walls of a yarn cake from the central hollow region of the cake. It was observed that when polyethylenimine (Polymin P) was added to the solution with ingredient A at normal strength, the fabric produced from the yarn treated thereby did not adhere to the vinyl plastic film nearly as well as the fabric of the sheeting under the procedure of Examples 1 to 3 at the optimum conditions described therein. An expedient tried was the reduction of the amount of conventional finish ingredient used in the finish solution which also contained polyethylenimine with a view to obtaining yarn that could be processed satisfactorily through coning, knitting and weaving operations. Aqueous yarn-finish solutions were prepared in accordance with the first two columns in Table IV below. The yarn treated therein and thereafter formed into fabric was united with polyvinyl chloride film of 2 mils in thickness. The data on each horizontal line of Table IV pertains to one sample of film and knitted rayon fabric laminate. The film and fabric were assembled into test strips as described in Example I.

*Table IV*

| Sample | Percent of Ingredient A | Percent of Polyethylenimine | Strength of seal in grams film attached to— | |
|---|---|---|---|---|
| | | | Face | Reverse Side |
| 1 | 0.6 | 0 | 16 | 38 |
| 2 | 0.6 | 1.0 | 123 | 335 |
| 3 | 0.3 | 1.0 | 201 | 460 |
| 4 | 0.1 | 1.0 | 231 | 316 |
| 5 | 0.1 | 0.5 | 245 | 450 |
| 6 | 0 | 0.5 | 272 | 525 |

The strengths indicated for "reverse side" of samples 3 to 6 are values at which the film broke; the actual strength of adhesion of the laminae was therefore some value greater than those recorded. The yarns of all of the samples except sample 6 were easy to process. From the standpoint of economy of materials, formation of the finish solution in accordance with sample 5 appears to be preferred over the other samples recorded above; although it is possible through further investigation to find the ultimate optimum percentage of Polymin P for use with 0.1 percent of ingredient A at some value either below, but more likely above, the 0.5 percent used in preparing sample 5. However, a finding of this refinement is not essential in the present invention since the optimum concentration may be affected by the use of other finish ingredients in combination with other polyalkylenimines and the polyalkylenimines may vary in extent of the hydrocarbon radicals attached to the ethylenimine nucleus and in the degree of polymerization. In the samples described above the actual amount of the polyethylenimine found in the finished yarn varied from 0.7 to 0.8 percent of its dry weight.

As discussed in the copending application Serial No. 518,947 filed on the same date with this application by Justice and Rosser, the polyalkylenimines are valuable in anchoring the various vinyl coatings from the group consisting of polyethylene and polymers and copolymers which are predominantly vinyl chloride or vinylidene chloride to cellulosic materials such as paper and cellophane, because of the chemical similarity of the regenerated cellulose fabric to the base material disclosed in said copending application, the polyalkylenimines are readily used to anchor films or sheets from the above defined group of vinyl resins to rayon fabric.

Various changes and modifications may be made in practicing the invention without departing from the spirit and scope thereof and, therefore, the invention is not to be limited except as defined in the appended claims.

I claim:
1. A flexible sheet comprising a layer comprising a resin selected from the group consisting of polyethylene, polyvinyl chloride, polyvinylidene chloride, and copolymers of vinyl chloride and vinylidene chloride, said copolymers consisting essentially of one of said compounds, and a rayon fabric strongly adhered to said layer by a polyalkylenimine disposed within said sheet.

2. A flexible sheet comprising a layer comprising a resin from the group consisting of polyethylene and the polymers and copolymers which are predominantly vinyl chloride and vinylidene chloride, a rayon fabric strongly adhered thereto by a polyalkylenimine uniformly distributed within the surface of the fabric adjacent the interface of the fabric and the layer and extending through said interface.

3. A flexible sheet comprising a layer comprising a resin selected from the group consisting of polyethylene, polyvinyl chloride, polyvinylidene chloride, and copolymers of vinyl chloride and vinylidene chloride, said copolymers consisting essentially of one of said compounds, and a rayon fabric strongly adhered to said layer by a polyethylenimine uniformly distributed within the surface of said fabric adjacent to the interface of said fabric and said layer and extending through said interface.

4. A flexible sheet as defined in claim 3 wherein the polyethylenimine in a 1 percent aqueous solution thereof at 25° C. has a specific viscosity greater than 0.15.

5. A flexible sheet as defined in claim 3 wherein the molecular weight of the polyethylenimine is at least 2300.

6. A flexible sheet as defined in claim 3 wherein the fabric is impregnated with polyethylenimine dried therein from a solution distributed within the fabric comprising 0.1 to 5 percent of polyethylenimine.

7. A flexible sheet as defined in claim 3 wherein the fabric comprises rayon yarn treated with a solution containing a mixture of a lubricating type yarn finish ingredient and a polyethylenimine.

8. A plastic sheet as defined in claim 7 wherein the concentration of the finish ingredient is approximately 0.1 percent and the concentration of the polyethylenimine is at least 0.5 percent.

9. A flexible sheet comprising a layer of polyvinyl chloride and a rayon fabric adhered thereto by a polyethylenimine uniformly distributed within the surface of the fabric adjacent the interface of the fabric and the layer and extending through said interface to strongly adhere the fabric to the layer.

10. A flexible sheet comprising a layer comprising a resin selected from the group consisting of polyethylene, polyvinyl chloride, polyvinylidene chloride, and copolymers of vinyl chloride and vinylidene chloride, said copolymers consisting essentially of one of said compounds, and a rayon fabric adhered to said layer by a polyethylenimine distributed uniformly throughout said fabric and extending through the interface of said fabric and the layer to strongly adhere one to the other, the weight of said polyethylenimine being approximately 0.6 to 0.8% of the dry weight of said fabric.

11. A flexible sheet comprising a layer comprising a resin selected from the group consisting of polyethylene, polyvinyl chloride, polyvinylidene chloride, and copolymers of vinyl chloride and vinylidene chloride, said copolymers consisting essentially of one of said compounds, and a knitted rayon fabric strongly adhered thereto by a polyalkylenimine extending through the interface of said fabric and said layer.

12. A flexible sheet as defined in claim 11 wherein the fabric comprises continuous filament yarn.

13. A flexible sheet as defined in claim 11 wherein the face of the knitted fabric is adhered to said layer.

14. A flexible sheet as defined in claim 11 wherein the fabric comprises continuous filament and the face thereof is adhered to the layer.

15. A method of making a flexible sheet comprising impregnating a rayon fabric with an incompletely polymerized, water dispersible polyalkylenimine, adhering said impregnated fabric in a dry condition to a solid layer of a resin selected from the group consisting of polyethylene, polyvinyl chloride, polyvinylidene chloride, and copolymers of vinyl chloride and vinylidene chloride, said copolymers consisting essentially of one of said compounds, by pressing said impregnated fabric and said layer together under conditions of elevated temperature and pressure sufficient to further polymerize said polyalkylenimine to a state wherein it is no longer subject to leaching by aqueous solution.

16. A method of making a flexible sheet comprising impregnating rayon yarn with a solution having dissolved therein a mixture comprising a minor amount of a lubricating-type finish material and a major amount of polyalkylenimine, said mixture not constituting more than about 1% of said solution, forming a fabric from said yarn, and adhering said fabric with said mixture dried therein to a solid layer of a resin selected from a group consisting of polyethylene, polyvinyl chloride, polyvinylidene chloride, and copolymers of vinyl chloride and vinylidene chloride, said copolymers consisting essentially of one of said compounds, by pressing said impregnated fabric and said layer together under conditions of elevated temperature and pressure sufficient to insolubilize said polyalkylenimine.

17. A method of making a flexible sheet comprising impregnating a rayon fibrous material with a solution having dissolved therein from about 0.1 to about 5% of a polyalkylenimine and adhering a fabric comprising said impregnated fibers in a dry condition to a layer of a resin selected from the group consisting of polyethylene, polyvinyl chloride, polyvinylidene chloride and copolymers of vinyl chloride and vinylidene chloride, said copolymers consisting essentially of one of said compounds by pressing said fabric and said layer together under conditions of elevated temperature and pressure sufficient to insolubilize said polyalkylenimine.

18. A method as defined in claim 17 wherein the fabric is knitted, the polyalkylenimine is a polyethylenimine of molecular weight greater than 2300, and the layer comprises polyvinyl chloride.

References Cited in the file of this patent

UNITED STATES PATENTS

| | | |
|---|---|---|
| 2,171,324 | Zetzsche et al. | Aug. 29, 1939 |
| 2,182,306 | Ulrich et al. | Dec. 5, 1939 |
| 2,237,344 | Evans et al. | Apr. 8, 1941 |
| 2,348,039 | Ulrich et al. | May 2, 1944 |
| 2,406,905 | Rothrock | Sept. 3, 1946 |
| 2,408,682 | Porter | Oct. 1, 1946 |
| 2,533,976 | Teague | Dec. 12, 1950 |
| 2,593,540 | Cornwell et al. | Apr. 22, 1952 |
| 2,698,793 | Landes et al. | Jan. 4, 1955 |
| 2,732,002 | Gardner et al. | Jan. 24, 1956 |
| 2,823,156 | Hedges | Feb. 11, 1958 |

FOREIGN PATENTS

| | | |
|---|---|---|
| 696,364 | Great Britain | Aug. 26, 1953 |